US012578741B2

(12) United States Patent　　(10) Patent No.:　US 12,578,741 B2
Słomiany et al.　　(45) Date of Patent:　Mar. 17, 2026

(54) PRESSURE CONTROL VALVE

(71) Applicant: Goodrich Corporation, Charlotte, NC (US)

(72) Inventors: Krzysztof Słomiany, Jerzmanowice (PL); Paweł Świrniak, Prochowice (PL); Piotr Jacek Kroczek, Nieciszów (PL)

(73) Assignee: GOODRICH CORPORATION, Charlotte, NC (US)

( * ) Notice: Subject to any disclaimer, the term of this patent is extended or adjusted under 35 U.S.C. 154(b) by 0 days.

(21) Appl. No.: 18/748,266

(22) Filed: Jun. 20, 2024

(65) Prior Publication Data

US 2025/0004488 A1　　Jan. 2, 2025

(30) Foreign Application Priority Data

Jun. 28, 2023　(EP) ..................................... 23461613

(51) Int. Cl.
*G05D 16/10*　　(2006.01)
(52) U.S. Cl.
CPC ......... *G05D 16/107* (2019.01); *G05D 16/103* (2013.01)
(58) Field of Classification Search
CPC ........ Y10T 137/7825; Y10T 137/7832; G05D 16/103; G05D 16/107; G05D 16/109
USPC ............................................. 137/505.41, 506
See application file for complete search history.

(56) References Cited

U.S. PATENT DOCUMENTS

| | | | | |
|---|---|---|---|---|
| 2,313,564 | A * | 3/1943 | Manly .................. | G05D 16/107 |
| | | | | 137/505.11 |
| 3,744,526 | A * | 7/1973 | MacNiel ............. | B63C 11/2209 |
| | | | | 128/205.24 |
| 4,455,923 | A | 6/1984 | Mueller | |
| 6,105,632 | A * | 8/2000 | Buhlmann ............... | A62B 9/02 |
| | | | | 141/197 |
| 10,261,526 | B2 * | 4/2019 | Tsuchida .............. | G05D 16/107 |
| 11,174,959 | B2 * | 11/2021 | Arisato ............... | F16K 27/0209 |
| 2004/0183057 | A1 * | 9/2004 | Bruzek ...................... | B66F 3/42 |
| | | | | 254/93 H |
| 2006/0157115 | A1 | 7/2006 | Dorogi et al. | |
| 2012/0325331 | A1 * | 12/2012 | Mangiagli ........... | F16H 61/0021 |
| | | | | 137/12 |
| 2016/0281871 | A1 * | 9/2016 | Kobayashi ......... | F02M 21/0239 |
| 2017/0147014 | A1 * | 5/2017 | Tsuchida ................. | F16K 17/30 |
| 2021/0285524 | A1 | 9/2021 | Shinoyama et al. | |

OTHER PUBLICATIONS

European Search Report for Application No. 23461613.4, mailed Nov. 7, 2023, 7 pages.

* cited by examiner

*Primary Examiner* — William M Mccalister
(74) *Attorney, Agent, or Firm* — CANTOR COLBURN LLP

(57) ABSTRACT

A pressure control valve includes: a valve housing extending along an axis (A); a valve seat; a valve piston mounted within the valve housing arranged to move axially within the valve housing relative to the valve seat; a compression spring located between the valve piston and an end of the valve housing to axially bias the valve piston relative to the valve seat; and a check valve located within the valve piston.

8 Claims, 14 Drawing Sheets

PRESSURE CONTROL VALVE

CROSS-REFERENCE TO RELATED APPLICATIONS

This application claims the benefit of European Patent Application No. 23461613.4 filed Jun. 28, 2023, the disclosure of which is incorporated herein by reference in its entirety.

TECHNICAL FIELD

The present disclosure relates to pressure control valve, specifically valves for reducing pressure of a fluid from a fluid supply source to a fluid target.

BACKGROUND

Fluid handling systems/hydraulic systems often require control valves to reduce the fluid pressure from a pressurized fluid supply source to have a pressure suitable for the fluid target. The control valve creates a fluid flow path through the valve that reduces the fluid pressure before it reaches the control valve outlet. Poppet valves are commonly used whereby a poppet moves axially relative to a valve seat, in the fluid flow path, to vary the width of the fluid flow passage through the control valve. Typically, springs are used to bias the poppet in the open and closed directions. The force of the springs and the fluid pressure downstream of the poppet regulate the position of the poppet relative to the valve seat.

A current pressure reducing valve design uses a stack of Belleville springs to bias the poppet. Belleville springs are popular in valve design because they produce high forces for small deflection, have minimum fatigue and long surface life, and the force of the stack can be adjusted by varying the number of Bellville springs in the stack. Such designs are useful, for such reasons, where space, weight allowance and maintenance time are limited, such as in aircraft.

A problem with such Belleville spring stacks in control valves, however, is that it can be difficult to assemble to obtain the precise desired pressure control since the whole stack will be covered in grease and will need to be cleaned and replaces, in an accurate stacking arrangement, every time maintenance is performed.

There is, therefore, a desire for a pressure control valve that overcomes these problems while still providing accurate pressure regulation in a relatively simple, lightweight and compact design.

SUMMARY

According to the present disclosure, there is provided a pressure control valve comprising: a valve housing extending along an axis; a valve seat; a valve piston mounted within the valve housing arranged to move axially within the valve housing relative to the valve seat; and a compression spring located between the valve piston and an end of the valve housing to axially bias the valve piston relative to the valve seat; and a check valve located within the valve piston.

BRIEF DESCRIPTION OF THE FIGURES

Examples of a control valve according to this disclosure will now be described with reference to the drawings. It should be noted that these are examples only, and variations are possible within the scope of the claims.

DETAILED DESCRIPTION

Figure 1:
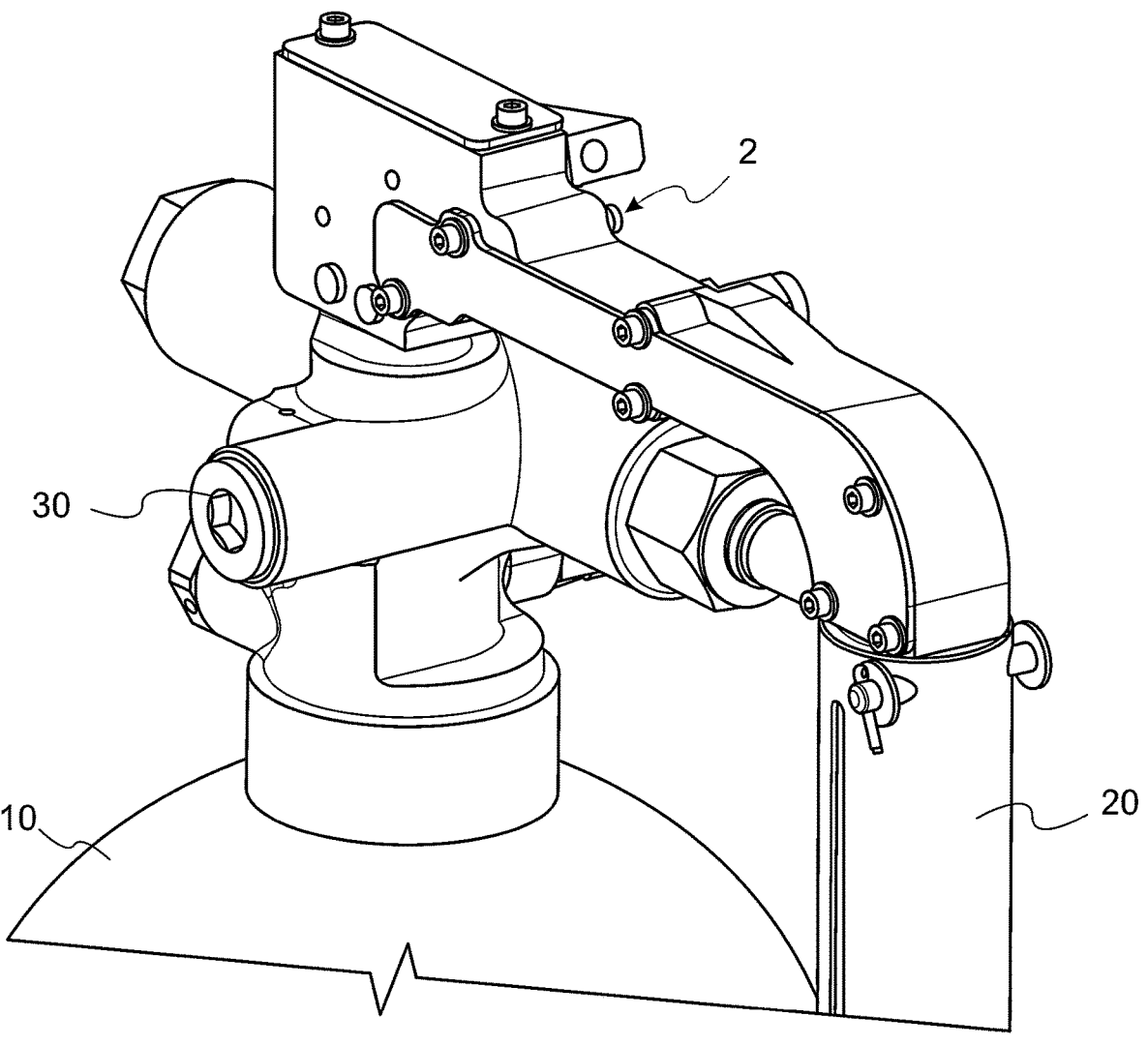
FIG. 1 shows a fluid system in which a pressure control valve according to the disclosure may be used.

FIG. 1 shows an example of a fluid system in which a pressure control valve may be used. A supply of pressurized fluid e.g. a pressurized gas bottle 10 contains pressurized fluid for use by a target e.g. an actuator (not shown) connected to an outlet (not shown in FIG. 1 but its location is generally indicated by reference numeral 20). The target requires fluid at a pressure lower than that of the fluid at the supply 10. Therefore, a pressure control valve 30 (also known as a regulator or pressure reducing valve) is provided between the supply 10 and the outlet 20.

The pressure control valve has a valve housing 31 and a valve piston 32 axially movable within the housing relative to a valve seat 33. The valve piston and the valve seat define a fluid flow channel therebetween to regulate the flow of fluid from the supply 10 to the outlet 20, as will be described further.

Figures 2, 3:
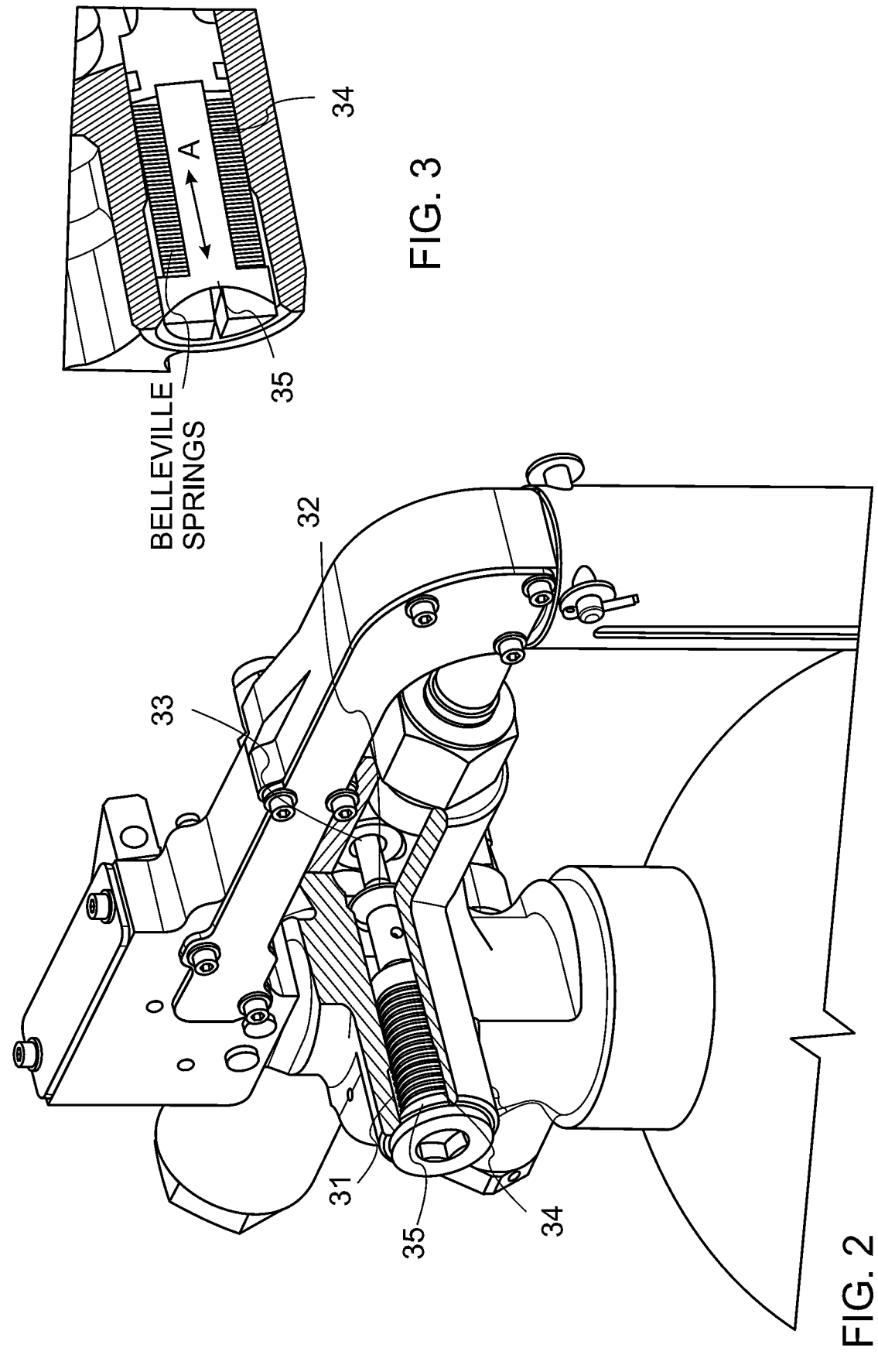
FIG. 2 shows a current pressure control valve having a stack of Belleville springs.
FIG. 3 shows the stack of Belleville springs in close-up.
Figure 4:
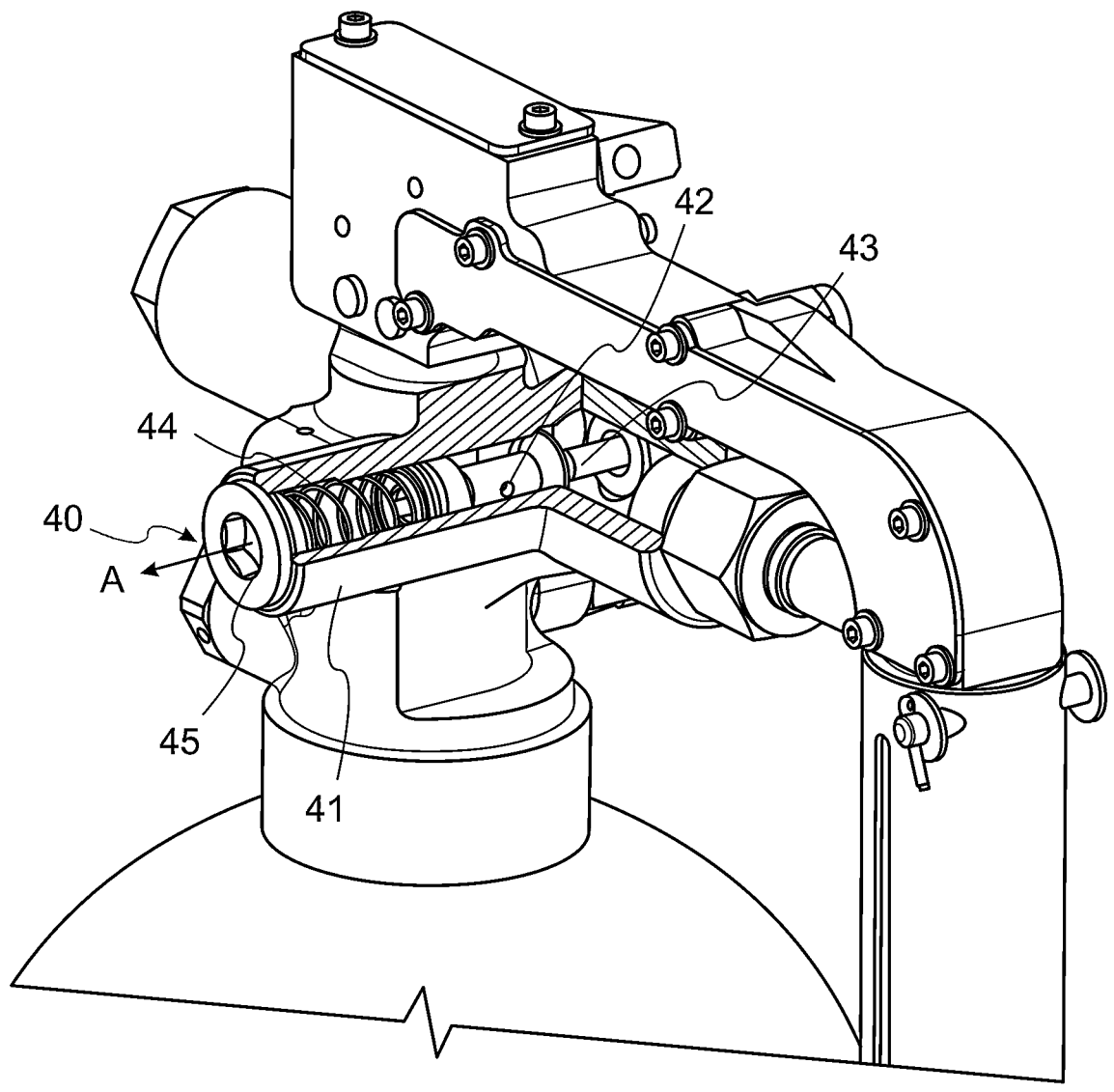
FIG. 4 shows a pressure control valve according to this disclosure.

A known design of pressure control valve, as mentioned above, and as shown in FIGS. 2 and 3, biases the piston, relative to the valve seat 33, using a stack of Belleville springs 34 located in the valve housing 31 between the valve piston 32 and an end 35 of the housing, the stack of springs exerting an axial force (with respect to the axis A of the housing) on the piston 32. The force exerted by the stack of Belleville springs can be adjusted by varying the number of Belleville springs. In a known system used in aircraft, for example, the stack may have 32 Belleville springs.

The pressure control valve 40 according this disclosure replaces the stack of Belleville springs with a compression spring 44 and a check valve 50. The pressure control valve 40, like the known design described with reference to FIGS. 2 and 3, has a housing 41, extending along an axis A within which is mounted a valve piston 42 arranged to move axially relative to a valve seat 43. The compression spring 44 is located between the piston 42 and an end 45 of the housing 41 to axially bias the piston relative to the valve seat 43. The check valve 50 is located inside the piston 42.

The piston 42 has a first end 421 proximate the valve seat 43 and a second, opposite end 422 adjacent the compression spring 44. The second end 422 is dimensioned to contain the check valve 50 and has an outer diameter sized to form a sealing engagement with the housing. A flange 423 is provided intermediate the first end and the second end and extends radially outwards towards the housing. The flange radial dimension is less than that of the second end but greater than that of the first end of the piston. The housing has a first inner diameter D1 in the region where the inlet 11 from the supply 10 is located, and a second, smaller inner diameter D2 between the first inner diameter region and the housing end 45. The flange radial dimension is less than the first inner diameter D1 of the housing but substantially equal to the second inner diameter D2. A first fluid chamber 1 is formed in the housing between the flange 423 and the second end 422 of the piston 42, a second fluid chamber 2 is formed between the second end 422 of the piston and the end 45 of the housing, and a third fluid chamber 3 is formed between the flange and the first end 421 of the piston. The first fluid chamber 1 is in fluid communication with the inlet 11 to the control valve from the supply 10. The third fluid chamber 3 is in fluid communication with the outlet 20.

Figure 5:
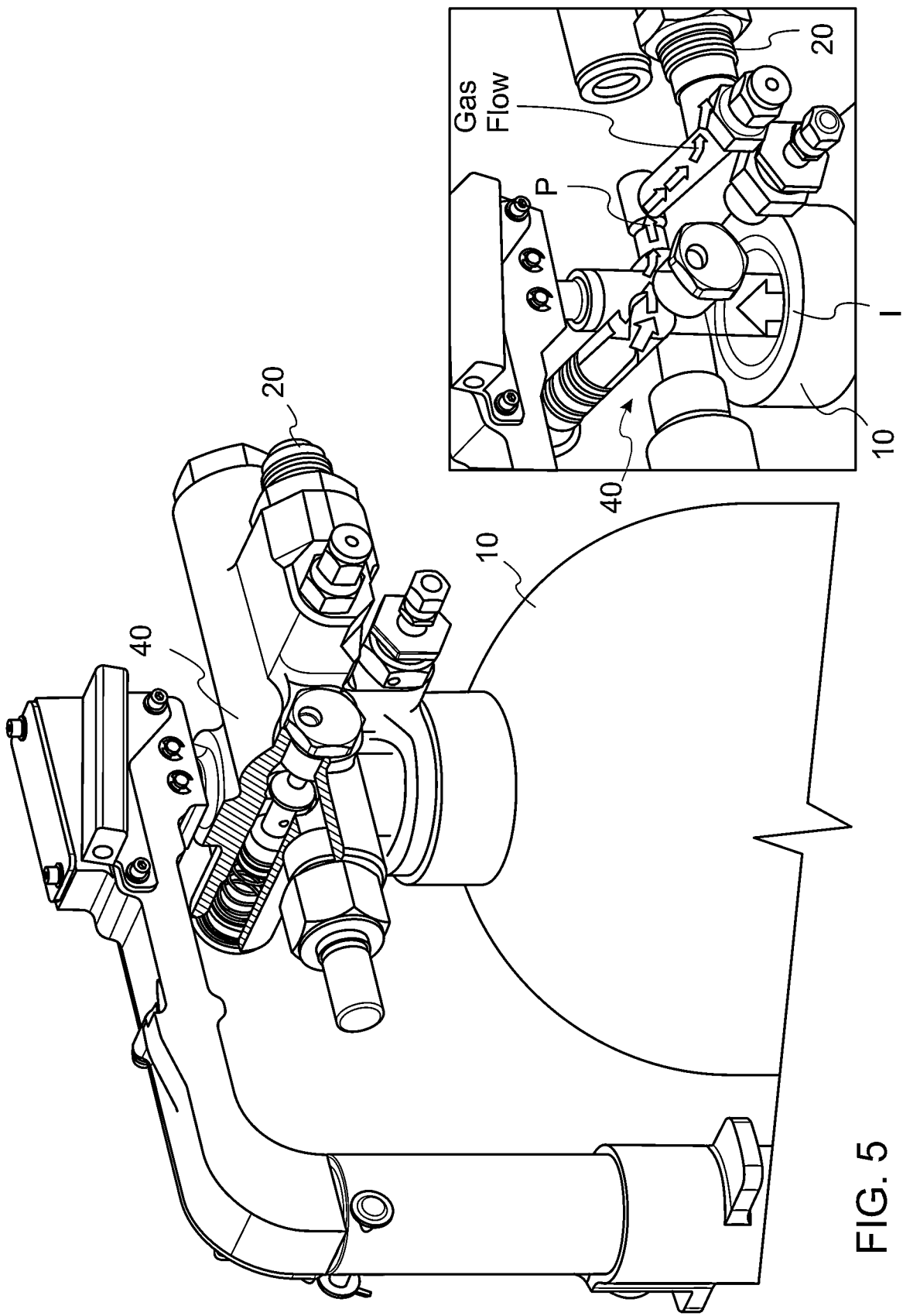
FIG. 5 shows an example of fluid flow through a pressure control valve such as shown in FIG. 4.
Figure 6:
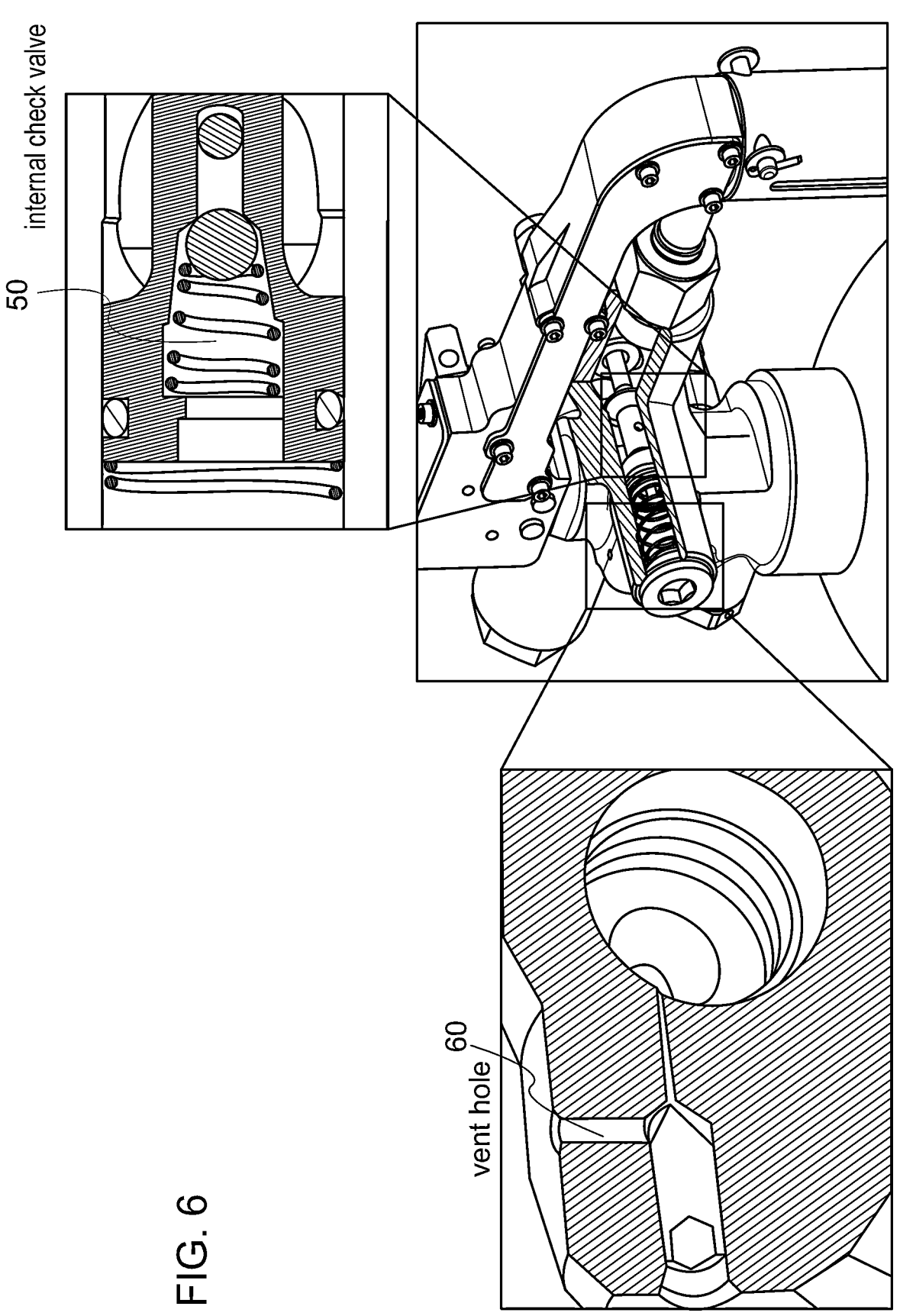
FIG. 6 shows details on an internal check valve and a vent hole which can be incorporated in a pressure control valve according to the disclosure.

As will be described in more detail below, to provide pressurized fluid to the target via the outlet 2, via the control valve 40, the supply (here the bottle 1) is opened in a known manner (by a trigger mechanism such as turning a knob, opening a lever, pulling a pin, or some other release mechanism) such that the high pressure fluid flows from the supply 1 into the control valve 40 as indicated by arrow I in FIG. 5. The pressure control valve defines a flow passage, by means of the piston 42 and the valve seat 43, through which the fluid flows (rather than just flowing directly to the outlet 2), indicated by arrows P, which has the effect of lowering the pressure in the fluid to the value required at the outlet, for the target. In FIG. 5, the decreasing size of the arrows I, P represent decreasing fluid pressure. The flow passage is regulated by the compression spring 42 and the check valve 50 as will be described further below. The pressure control valve of this disclosure uses force from the fluid pressure as well as the compression spring and the check valve to regulate the fluid flow.

A vent hole 60 may be provided through the housing behind the piston (where the compression spring is located in the housing) so that the pressure control valve 40 can operate as a self-controlling closed-loop mechanism.

Figure 7:
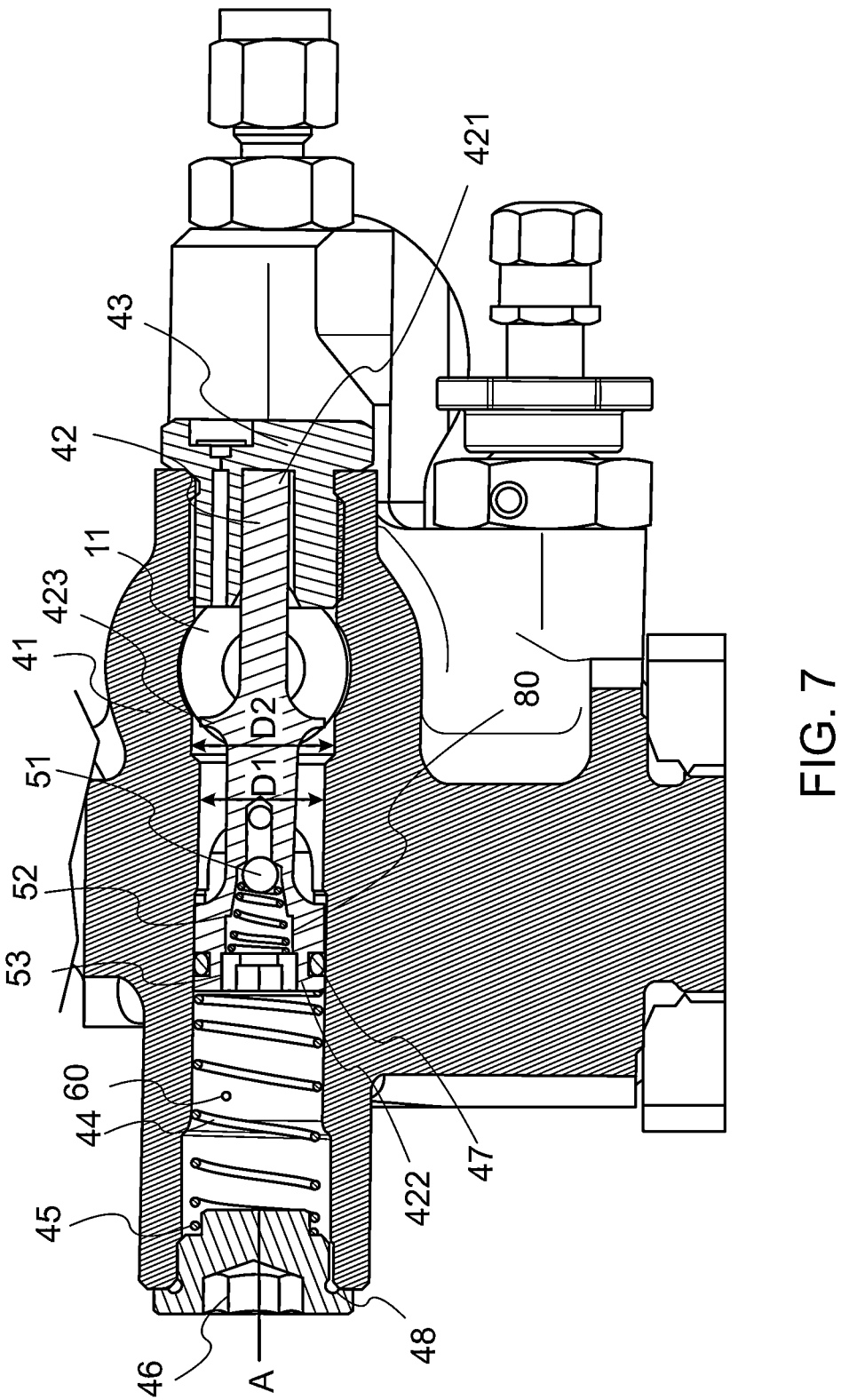
FIG. 7 is a cross-section through a pressure control valve according to the disclosure.

Features of a pressure control valve 40 according to this disclosure can be seen in the cross-sectional of one example, shown in FIG. 7. This shows the valve housing 41 having axis A. The valve piston 42 is located, and extends axially within the housing, arranged to move axially relative to the housing and relative to a valve seat 43. The compression spring 44 is located between the piston 42 and the end 45 of the valve housing (sealed by a plug 46 or the like) to axially bias the piston. The check valve 50 is provided inside the piston. The check valve includes a check valve ball 51 biased relative to the piston by a check valve spring 52, and a check valve nut 53 to secure the check valve spring within the piston. The vent hole 60 is formed in the valve housing in the area where the compression spring is located.

Figure 8:
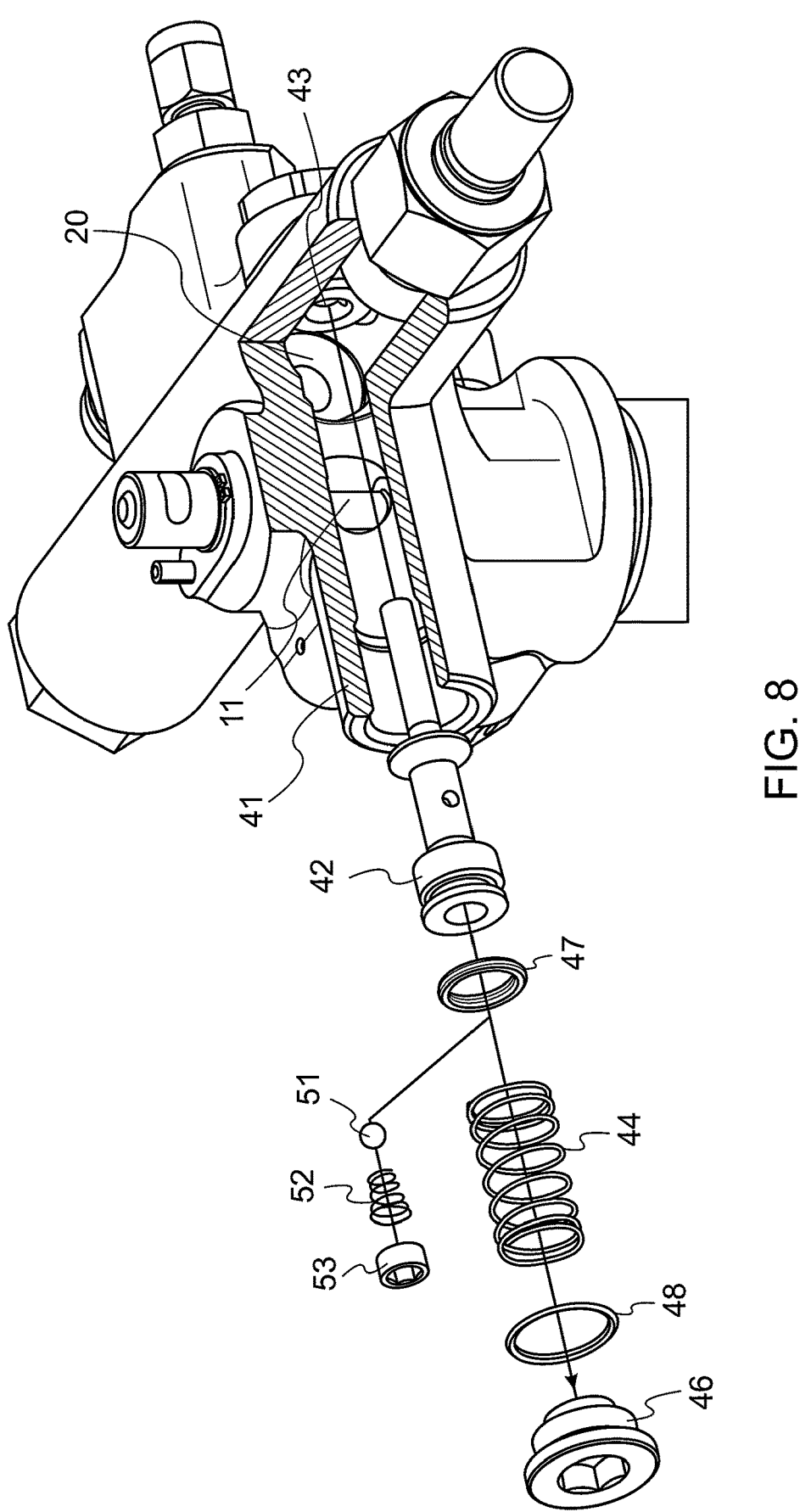
FIG. 8 is an exploded view of a pressure control valve according to the disclosure.

Seals e.g. O-rings 47, 48, may be provided between the piston 42 and the valve housing 41 and between the end plug 46 and the end 45 of the valve housing. In FIG. 7, reference numeral 11 indicates the entry point to the pressure control valve for the fluid from the fluid supply 10. The components of the pressure control valve are also shown in the exploded view of FIG. 8.

The operation of the pressure control valve will now be described with reference to the examples shown in FIGS. 9 to 14.

Figure 9:
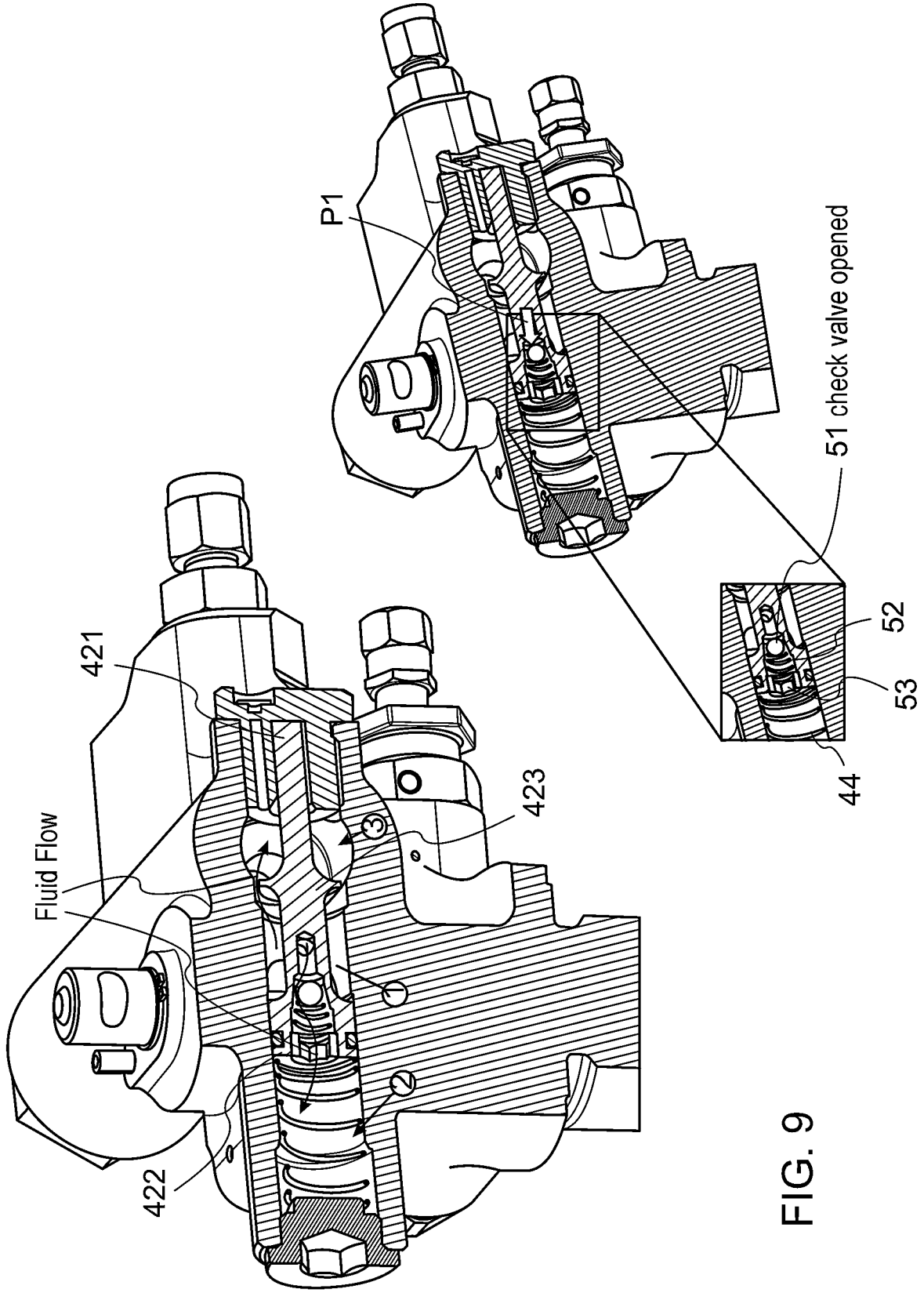
FIG. 9 illustrates operation of a pressure control valve according to the disclosure.

When the high pressure supply 10 is opened the fluid is released into the pressure control valve 40, at inlet 11 and fills the first chamber 1. The fluid pressure in the first chamber 1 is therefore high relative to the force of the check valve spring 52 and so, initially, the high pressure fluid in the first chamber 1 acts against the check valve spring 52 causing that spring 52 to compress and therefore moving the check valve ball 51 out of engagement with the piston. The stiffness of the check valve spring 52 determines the pressure differential controlling the valve. The force of the check valve spring 52 can be regulated using the check valve nut 53 during assembly. Opening of the check valve allows fluid from the first chamber 1 to flow through the open check valve 50 into the second chamber 2. Further, because the flange 423 does not contact the housing when the piston is in this position, the flange being located where the inner diameter of the housing is D1, fluid can also flow past the flange into the third chamber 3. The pressure of the fluid in the first and third chambers is reduced, relative to the high pressure fluid from the supply, by the force of the check valve spring 52 which has been overcome by the fluid pressure in the second chamber 2. Arrow P1 in FIG. 9 shows the force acting on the check valve 50 to open the check valve.

Figure 10:
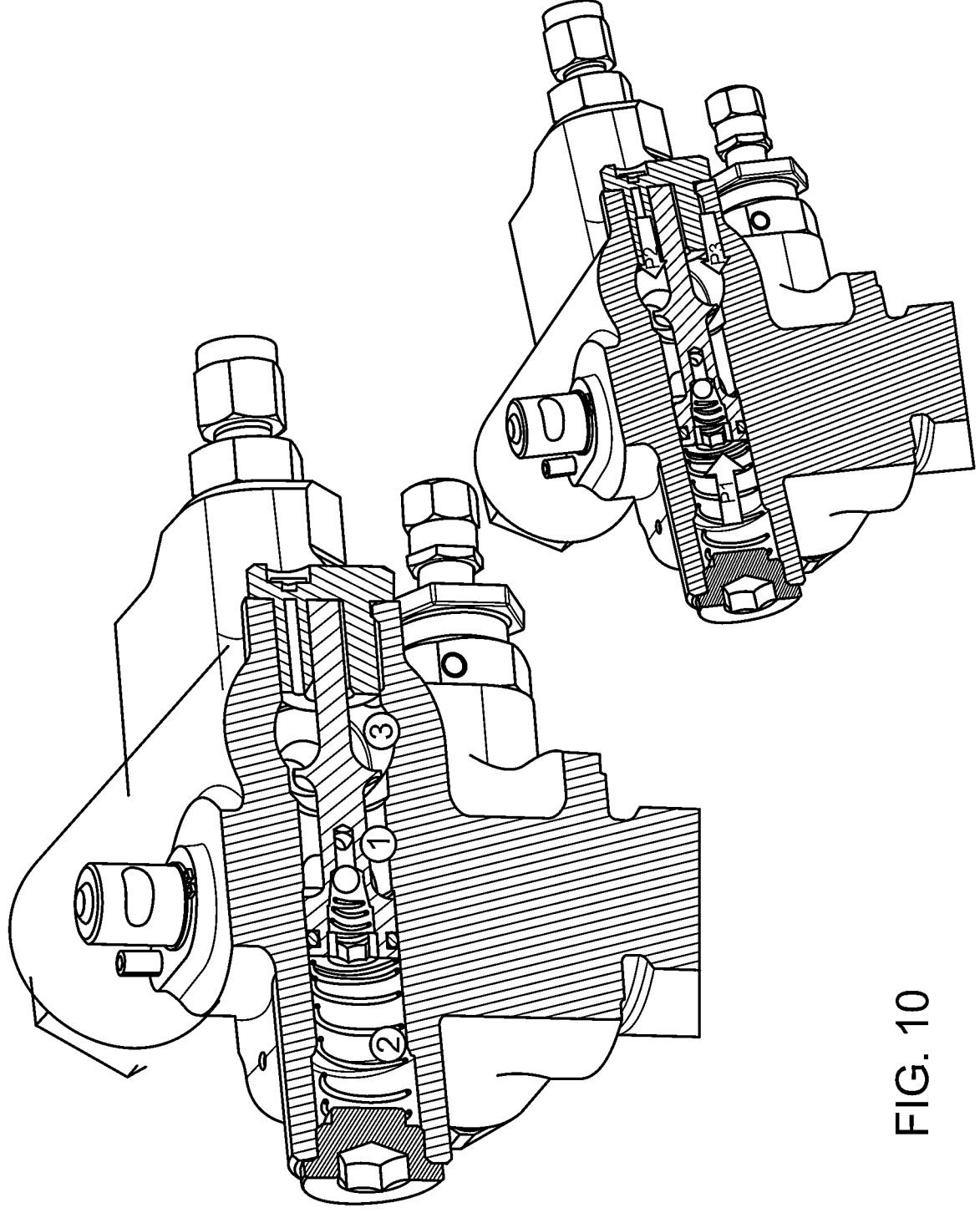
FIG. 10 illustrates operation of a pressure control valve according to the disclosure.
Figure 11:
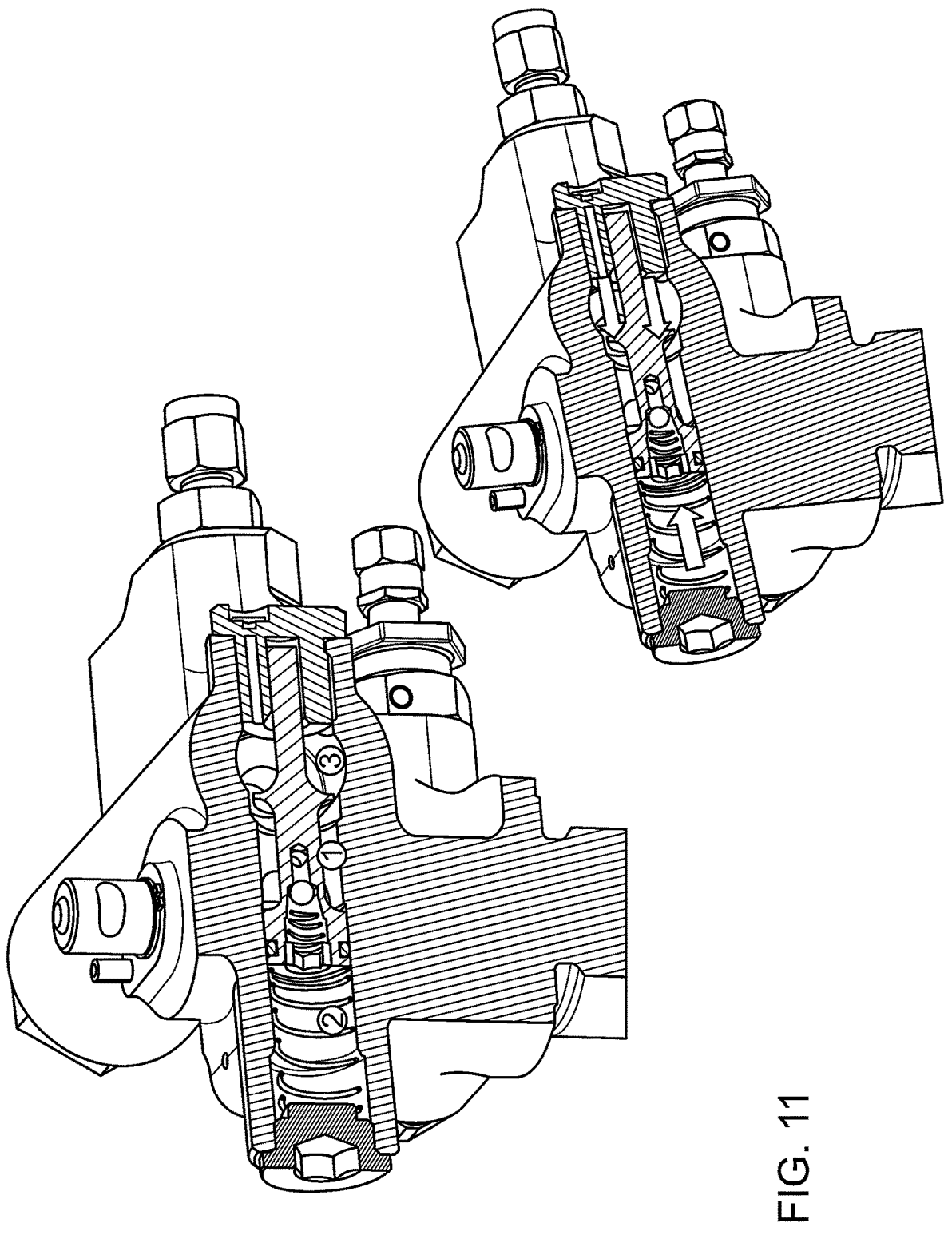
FIG. 11 illustrates operation of a pressure control valve according to the disclosure.
Figure 12:
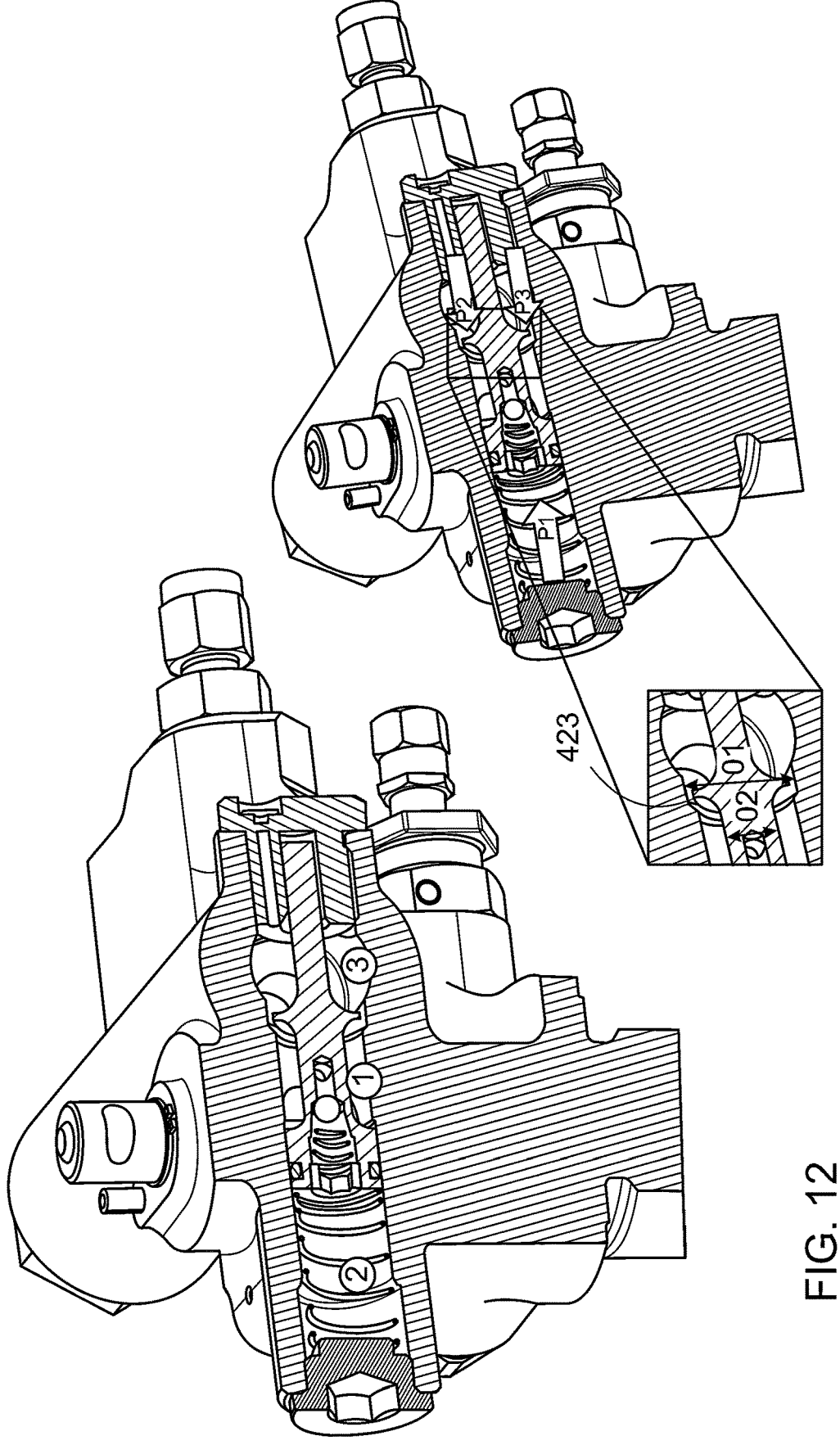
FIG. 12 illustrates operation of a pressure control valve according to the disclosure.

As fluid continues to flow into the check valve, the pressure in the third chamber 3 increases (FIG. 10). When this pressure (P2 in FIG. 10) has reached a value that exceeds the force (indicated by arrow F1 in FIG. 10) of the compression spring 44, the piston moves against the bias of the compression spring 44, towards the end 45 of the housing, thus compressing the fluid in the second chamber 2. (FIG. 11).

As the pressure in the third chamber 3 continues to increase (P3 in FIG. 12), the piston moves further to the left (in the drawings—i.e. towards the end 45 of the housing) until the flange 423 abuts the second inner diameter D2 of the housing. This then closes the fluid path from the second fluid chamber 2 to the third fluid chamber 3, and, hence, from the inlet 11 to the outlet 20.

Figure 13:
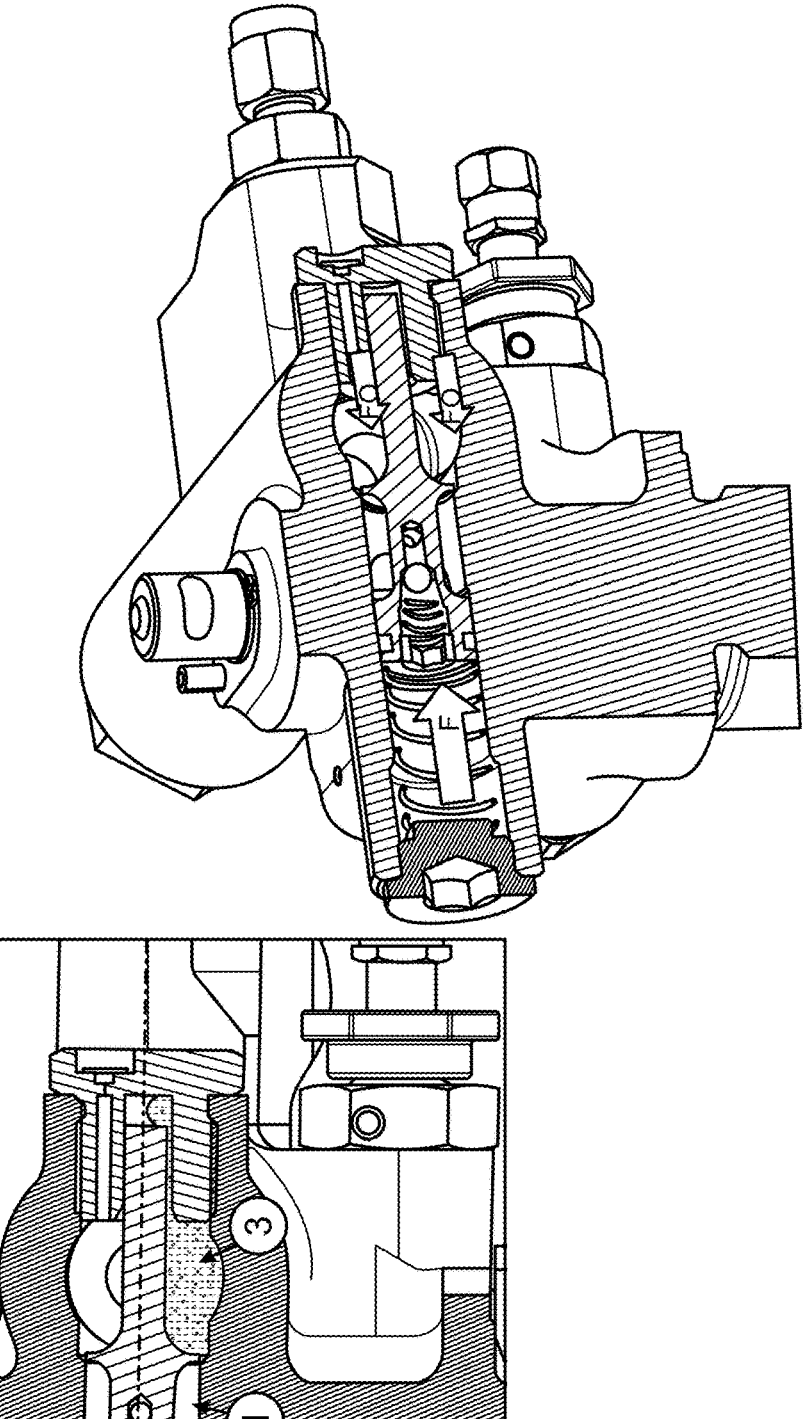
FIG. 13 illustrates operation of a pressure control valve according to the disclosure.
Figure 14:
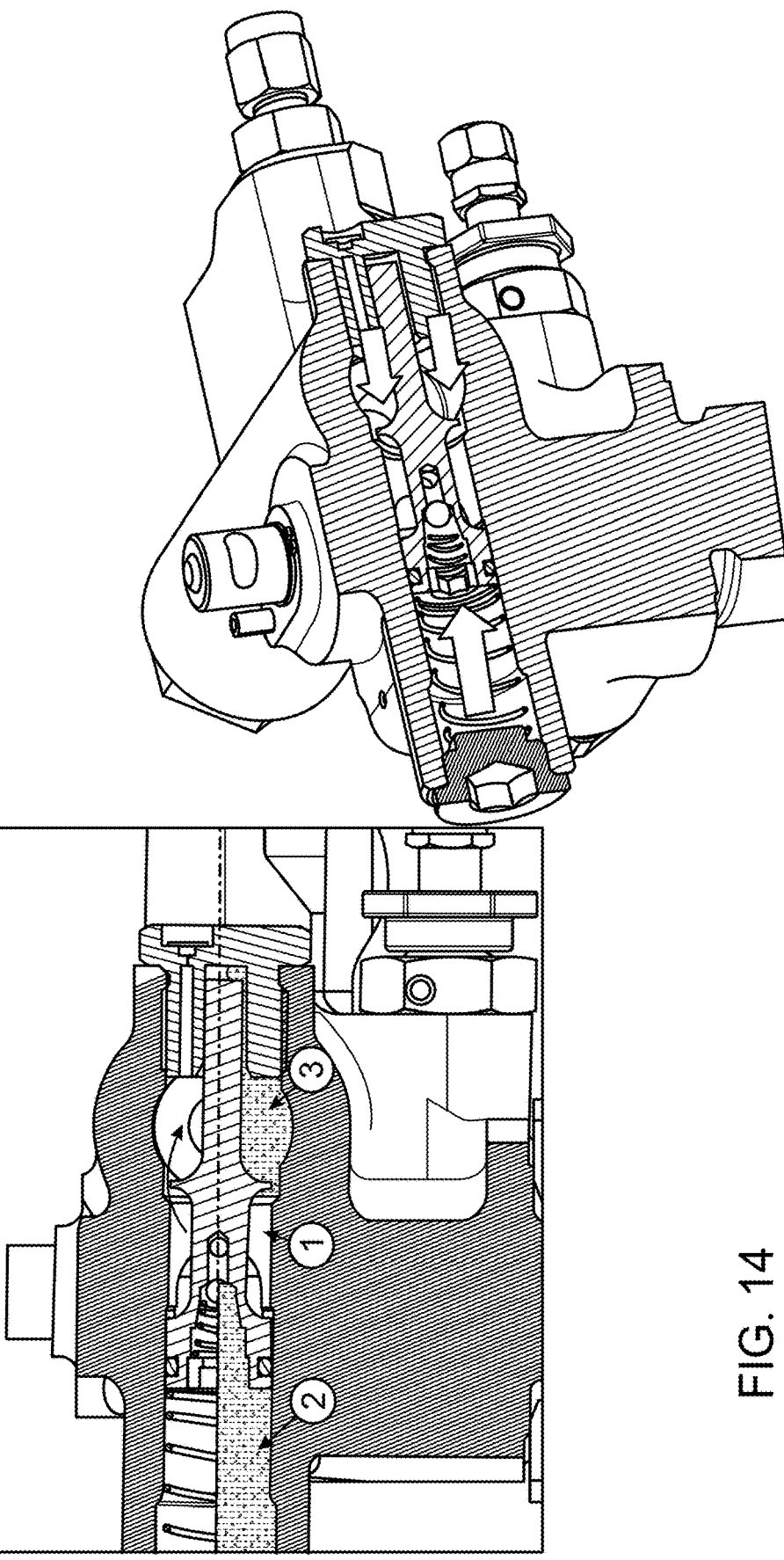
FIG. 14 illustrates operation of a pressure control valve according to the disclosure.

The fluid in the third fluid chamber 3 then flows out of the outlet 20 and so its pressure reduces (P0 in FIG. 13). At this stage, the forces in the second fluid chamber (the combined fluid pressure and compression spring force) will act on the piston causing it to move to the right (in the drawings) which, again, moves the flange to the larger inner diameter D1 part of the housing, again opening the path for fluid from the inlet to the third fluid chamber 3 and the outlet.

After a few cycles of this operation, the pressure then on both sides of the piston can be equalized (FIG. 14) and reduced to a value required by the target. The control valve therefore becomes self-controlling.

The force that was, in the Belleville spring design, generated by the springs to control the poppet/piston is now generated by the fluid from the supply 10, in the pressure control valve. Because the compression spring 44 is only needed to hold the piston in position before the pressurized fluid is released from the supply into the pressure control valve, it does not need to be vary stiff and so can be simpler and lighter.

Figure 15:
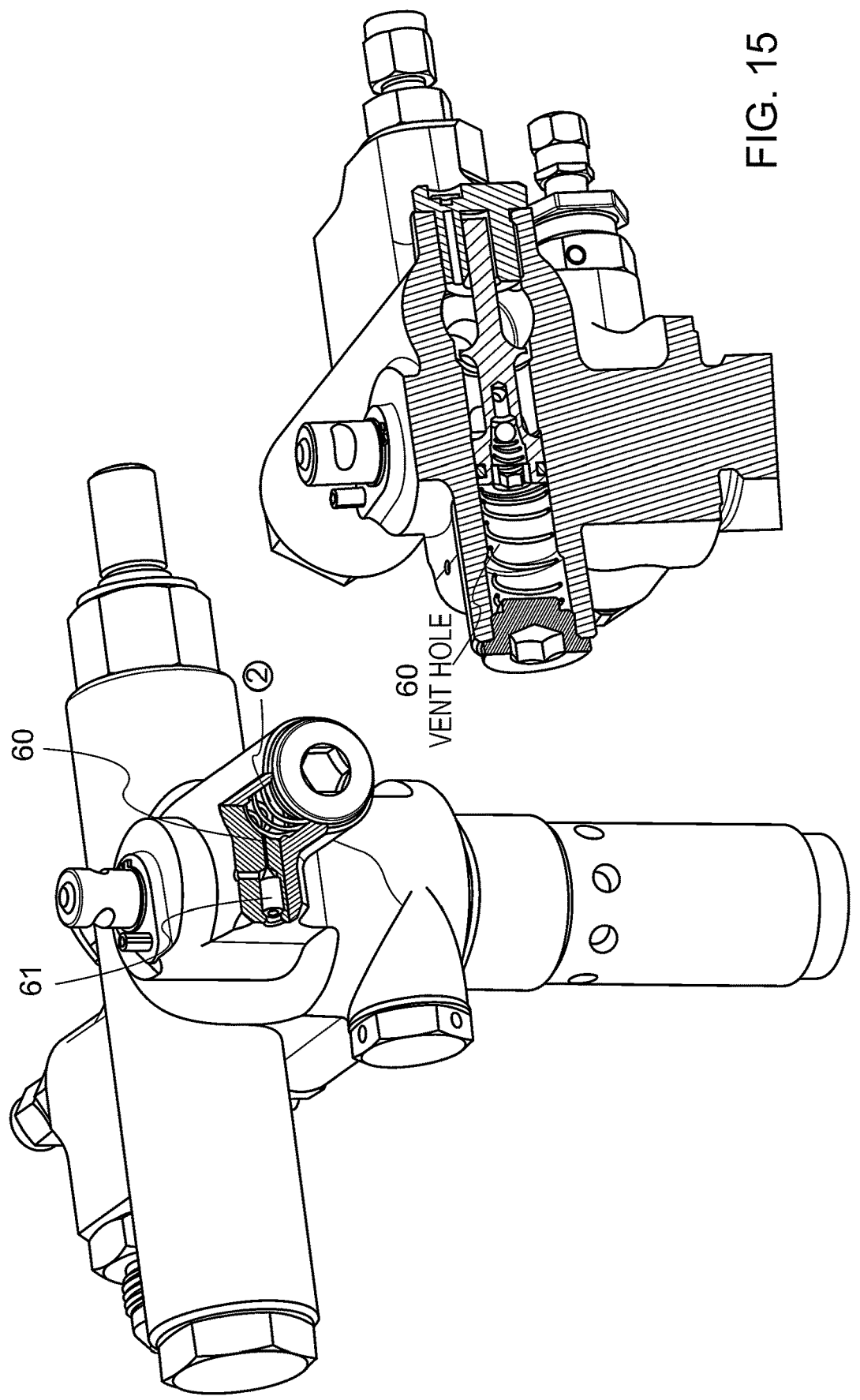
FIG. 15 shows a vent hole feature of an example of a pressure control valve according to the disclosure.

In one example, as seen in FIG. 15, a vent hole 60 can be formed in the housing between the second fluid chamber 2 and atmosphere. This allows the pressure difference between the second and third fluid chambers to be controlled during operation, and pressure to be released. A set screw 61 may be provided to open or close, or regulate the size of the vent hole 60 to regulate the pressure release. The set screw 61 can be tightened to close the vent hole 60 or untightened to open the vent hole. This enables control of leakage through the vent hole 60. The check valve is, however, present in case the pressure is released too quickly.

The replacement of the stack of Belleville springs with the compression spring and check valve of this disclosure provides a pressure control valve of relatively lower size, weight and number of parts, for which assembly and service procedures are simplified. The pressure control valve also has a self-control mechanism.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

The invention claimed is:

1. A pressure control valve comprising:
a valve housing extending along an axis (A);
an inlet configured to be connected to a high pressure fluid supply;
an outlet;
a valve seat;
a valve piston mounted within the valve housing arranged to move axially within the valve housing relative to the valve seat;
a compression spring located between the valve piston and an end of the valve housing to axially bias the valve piston relative to the valve seat; and
a check valve located within the valve piston; wherein the check valve comprises:
a check valve ball biased relative to the valve piston by a check valve spring whose stiffness determines a pressure differential controlling operating of the pressure control valve;
wherein the valve piston has a first end proximate the valve seat and a second, opposite end adjacent the compression spring; and
wherein the second end is configured to receive the check valve

6 wherein the valve piston has a first end proximate the valve seat and a second, opposite end adjacent the compression spring; and
wherein the second end is configured to receive the check valve;
the check valve further comprising:
a flange intermediate the first end and the second end extending radially outwards towards the valve housing;
wherein:
a first fluid chamber is formed in the valve housing between the flange and the second end of the valve piston;
a second fluid chamber is formed between the second end of the valve piston and the end of the valve housing;
a third fluid chamber is formed between the flange and the first end of the valve piston; and
the first fluid chamber is provided to be in fluid communication with a fluid supply for controlling operation of the valve and the third fluid chamber provides fluid to a control valve outlet;
wherein the second end of the valve piston has an outer diameter sized to form a sealing engagement with the valve housing, the flange has a radial dimension that is less than that of the second end of the valve piston but greater than the first end of the valve piston;
wherein the pressure control valve configured such that:
high pressure fluid flows from the inlet into the first fluid chamber, and acts against the force of the check valve spring to open the check valve to permit fluid from the first fluid chamber to flow through the check valve to the second fluid chamber and further into the third fluid chamber; and
as fluid continues to flow from the inlet, the pressure of the fluid in the third fluid chamber increases until it overcomes the compression spring and compresses it to move the piston into the second fluid chamber until the flange abuts the valve housing to close the flow path from the second fluid chamber to the third fluid chamber whereupon the fluid in the third fluid chamber flows out through the outlet such that the pressure acting from the third fluid chamber on the compression spring is reduced and the compression spring expands to move the piston to re-open the flow path from the second fluid chamber to the third fluid chamber.

2. The pressure control valve of claim 1, wherein the valve housing has a first inner diameter in the region where fluid enters the valve from the fluid supply and a second, smaller, inner diameter between the location having the first inner diameter and the end of the valve housing.

3. The pressure control valve of claim 1, further comprising:
a vent hole through the valve housing behind the valve piston.

4. The pressure control valve of claim 3, wherein the vent hole is provided in the housing in a region where the compression spring is located.

5. The pressure control valve of claim 1, wherein the end of the valve housing is sealed by a plug.

6. The pressure control valve of claim 1, wherein the check valve further comprises:
a check valve nut to secure the check valve spring within the valve piston.

7. A fluid system comprising:
a fluid supply; and
a pressure control valve as claimed in claim 1 to regulate the pressure of the fluid from the fluid supply.

8. The fluid system of claim 7, wherein the supply comprises:

a bottle having a neck opening to which the pressure control valve is fluidly attached.

\* \* \* \* \*